(12) United States Patent
Pedder et al.

(10) Patent No.: US 11,435,583 B1
(45) Date of Patent: Sep. 6, 2022

(54) ELECTRONIC DEVICE WITH BACK-TO-BACK DISPLAYS

(71) Applicant: Apple Inc., Cupertino, CA (US)

(72) Inventors: James E. Pedder, Oxford (GB); James H. Foster, Oxford (GB); Paul G. Puskarich, London (GB); Thomas M. Gregory, Cambridgeshire (GB); Richard J. Topliss, Cambridge (GB); Patrick R. Gill, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 378 days.

(21) Appl. No.: 16/221,330

(22) Filed: Dec. 14, 2018

Related U.S. Application Data (60) Provisional application No. 62/618,502, filed on Jan. 17, 2018.

(51) Int. Cl.
  *G02B 27/01* (2006.01)
  *G06F 3/14* (2006.01)
  *G06F 3/01* (2006.01)

(52) U.S. Cl.
  CPC ......... *G02B 27/0172* (2013.01); *G06F 3/013* (2013.01); *G06F 3/1423* (2013.01); *G02B 27/0176* (2013.01); *G02B 2027/014* (2013.01); *G02B 2027/0123* (2013.01); *G02B 2027/0174* (2013.01)

(58) Field of Classification Search
  CPC ........ G02B 27/0172; G02B 2027/0178; G02B 2027/0134; G02B 30/26–28; G02F 1/133342

USPC .......................................................... 359/630
See application file for complete search history.

(56) References Cited

U.S. PATENT DOCUMENTS

| | | | | |
|---|---|---|---|---|
| 5,465,175 A | * | 11/1995 | Woodgate | G09F 19/12 359/463 |
| 6,043,799 A | * | 3/2000 | Tidwell | G02B 7/287 345/7 |
| 7,486,341 B2 | * | 2/2009 | Hong | G02B 27/017 349/11 |
| 7,688,509 B2 | * | 3/2010 | Vissenberg | G02B 26/005 359/463 |
| 8,477,425 B2 | | 7/2013 | Border et al. | |
| 8,508,830 B1 | * | 8/2013 | Wang | G02B 3/0006 359/267 |

(Continued)

FOREIGN PATENT DOCUMENTS

DE  102009054232 A1 *  5/2011  ......... G02B 27/0101

*Primary Examiner* — Zachary W Wilkes
(74) *Attorney, Agent, or Firm* — Treyz Law Group, P.C.; G. Victor Treyz; Kendall P. Woodruff (57) ABSTRACT

An electronic device may have back-to-back displays. A user-facing display may have microlenses, tunable lens structures, holograms, lasers, and other structures for displaying images in multiple eye boxes while the electronic device is being worn on the head of a user. In some configurations, a switchable diffuser may be incorporated into the user-facing display. In one mode, the switchable diffuser allows microlenses of the pixels of the user-facing display to provide images to eye boxes in which images from the display are viewable. In another mode, the switchable diffuser diffuses light from the pixels so that the user-facing display may be used while the device is being held in the hand of the user.

22 Claims, 10 Drawing Sheets

(56) References Cited

U.S. PATENT DOCUMENTS

| | | | | |
|---|---|---|---|---|
| 8,558,853 | B2* | 10/2013 | Sagardoyburu | G02F 1/1323 345/690 |
| 8,890,771 | B2 | 11/2014 | Pance | |
| 9,250,445 | B2* | 2/2016 | Tosaya | G02B 27/0172 |
| 9,279,989 | B2* | 3/2016 | Song | H04N 13/366 |
| 9,335,548 | B1* | 5/2016 | Cakmakci | G06F 3/017 |
| 9,674,510 | B2* | 6/2017 | Aiden | H04N 13/366 |
| 9,798,144 | B2* | 10/2017 | Sako | G09G 5/10 |
| 9,841,537 | B2* | 12/2017 | Luebke | G02B 27/0172 |
| 10,088,673 | B2* | 10/2018 | Xu | G02B 27/0172 |
| 10,191,283 | B2* | 1/2019 | Alexander | G02B 27/0172 |
| 10,197,808 | B2* | 2/2019 | Du | G02B 27/0172 |
| 10,210,844 | B2* | 2/2019 | Kollin | G02B 27/0172 |
| 10,545,336 | B2* | 1/2020 | Dubey | H01L 27/3267 |
| 10,754,296 | B1* | 8/2020 | Zhang | G03H 1/2294 |
| 10,761,327 | B2* | 9/2020 | Trail | G02B 27/0172 |
| 10,855,977 | B2* | 12/2020 | Perreault | G02F 1/29 |
| 10,939,085 | B2* | 3/2021 | Li | G06F 3/048 |
| 2001/0005284 | A1* | 6/2001 | Lee | G02B 30/26 359/619 |
| 2006/0176242 | A1 | 8/2006 | Jaramaz et al. | |
| 2006/0238545 | A1* | 10/2006 | Bakin | G02B 30/27 345/613 |
| 2011/0255159 | A1* | 10/2011 | Michael Krijn | G02B 30/27 359/463 |
| 2012/0068913 | A1 | 3/2012 | BarZeev et al. | |
| 2013/0169545 | A1* | 7/2013 | Eaton | G06F 1/1647 345/173 |
| 2015/0145751 | A1* | 5/2015 | Momonoi | G02B 3/0006 345/8 |
| 2015/0379896 | A1* | 12/2015 | Yang | G02B 27/017 434/112 |
| 2016/0025978 | A1 | 1/2016 | Mallinson | |
| 2016/0349509 | A1 | 12/2016 | Lanier et al. | |
| 2018/0095278 | A1* | 4/2018 | Masson | G02B 27/0081 |
| 2018/0203231 | A1* | 7/2018 | Glik | G02B 27/0103 |
| 2019/0041719 | A1* | 2/2019 | Zhuang | G02B 27/017 |
| 2019/0043392 | A1* | 2/2019 | Abele | G09G 3/3406 |
| 2019/0124313 | A1* | 4/2019 | Li | H04N 13/106 |
| 2021/0080730 | A1* | 3/2021 | Morrison | G02B 27/0172 |

* cited by examiner

ELECTRONIC DEVICE WITH BACK-TO-BACK DISPLAYS

This application claims the benefit of provisional patent application No. 62/618,502, filed Jan. 17, 2018, which is hereby incorporated by reference herein in its entirety.

FIELD

This relates generally to electronic devices and, more particularly, to electronic devices with displays.

BACKGROUND

Electronic devices such as head-mounted devices have displays. Head-mounted devices such may be used to provide a user with virtual content. In some arrangements, computer-generated content may be overlaid on top of real-world content. Cellular telephones and other portable devices have displays for presenting a user with text message content, web pages, and other images when the device is held in the user's hand.

These types of devices may be relatively inflexible and may not be able to provide a user with desired content in a variety of situations.

SUMMARY

An electronic device may have back-to-back displays. A first of the displays may be used to display content for a user. A second of the displays may display publically viewable images while the electronic device is being worn on the head of the user.

The first display may be operated in one or more modes. For example, the first display may be operated in a first mode in which a user may view images directly on the display while the device is being held in the hand of the user. In a second mode, the user may be presented with images such as virtual reality images while the electronic device is being worn on the head of the user and while lenses in the display are used to direct the images into an eye box. The second display may be used to display images for the user (e.g., when the user is holding the device in the first mode) or publicly viewable images (e.g., when the device is being worn on the user's head in the second mode).

The first display may have microlenses, tunable lens structures, holograms, lasers, and other structures for displaying images in multiple selectable eye boxes while the electronic device is being worn on the head of a user. These structures may include tunable lenses or other optical components that allow control circuitry in the device to adjust the first display to accommodate vision defects of the user such as nearsightedness.

In some configurations, a switchable diffuser may be incorporated into the second display. In the second mode of operation, the switchable diffuser may allow microlenses of the pixels of the second display to produce collimated light that is focused by a user's eyes to form virtual images. The virtual images may be overlaid on images of the real world that are captured by a front-facing camera on the electronic device while the electronic device is being worn by the user. In the first mode of operation, the switchable diffuser may diffuse light from the pixels so that the second display may be used while the device is being held in the hand of the user.

DETAILED DESCRIPTION

Figure 1:
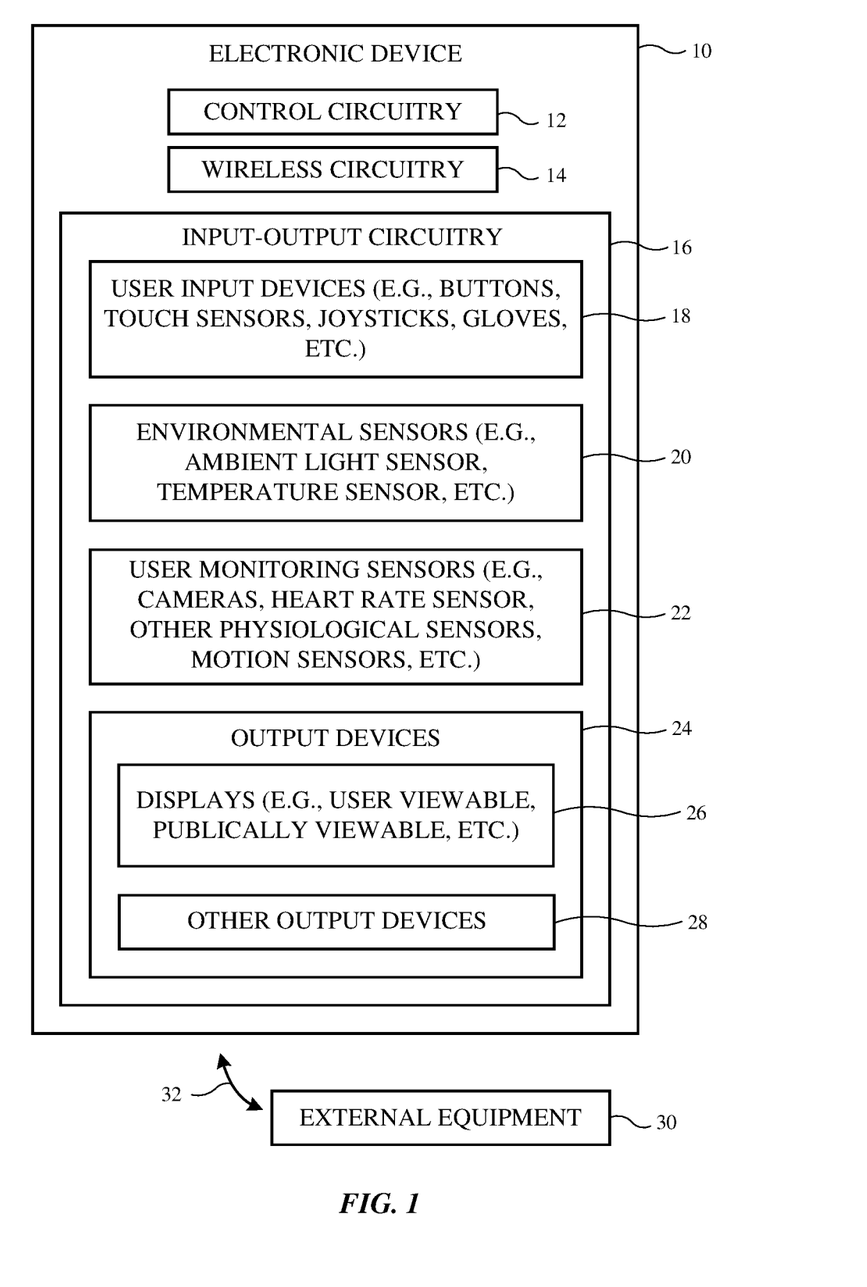
FIG. 1 is a schematic diagram of an illustrative electronic device in accordance with an embodiment.

A schematic diagram of an illustrative electronic device such as a head-mounted device is shown in FIG. 1. As shown in FIG. 1, electronic device 10 may have control circuitry 12. Control circuitry 12 may include storage and processing circuitry for controlling the operation of electronic device 10. Circuitry 12 may include storage such as nonvolatile memory (e.g., electrically-programmable-read-only memory configured to form a solid state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations such as operations involved in gathering information with sensors, operations involving the adjustment of components using control signals, operations involving the presentation of images on displays in device 10, etc.).

Electronic device 10 may include communications circuitry for operating with external devices such as eternal equipment 30 over wired and/or wireless communications links such as communications link 32. Electronic device 10 may, for example, include wireless circuitry 14. Wireless circuitry 14 may include wireless communications circuitry. The wireless communications circuitry may include one or more antennas and radio-frequency transceiver circuitry for transmitting and receiving wireless signals over wireless links such as illustrative wireless link 32 with external equipment 30. If desired, external equipment 30 may be coupled to device 10 using wired connections in addition to or instead of using wireless communications. External equipment 30 may be a peer device (e.g., another device having the components of device 10 of FIG. 1), may be accessories, may be host computers or other host equipment, may include online data sources (e.g., servers for supplying weather information and/or other information), and/or may be other circuitry external to device 10.

Wireless communications circuitry in device 10 (e.g., circuitry in wireless circuitry 14) may be used in communicating with wireless local area network equipment (e.g., WiFi® equipment in equipment 30). Wireless communications circuitry in device 10 may also communicate using cellular telephone frequencies, using near-field communications, and/or using other wireless communications bands and protocols. If desired, wireless communications circuitry or other wireless circuitry 14 in device 10 may be used to detect and/or identify electronic devices (e.g., equipment 30) associated with people in the vicinity of device 10. For example, equipment 30 may be a portable electronic device associated with an acquaintance of the user of device 10. Equipment 30 may broadcast local wireless signals that identify equipment 30 as belonging to the acquaintance of the user (e.g., short-range signals having a range of 0-10 m, at least 1 m, at least 2 m, less than 20 m, etc.). In this type of arrangement, device 10 can use wireless circuitry 14 to detect the broadcast wireless signals and thereby detect when the acquaintance of the user is in the vicinity of device 10 and the user. Other techniques for identifying nearby individuals may also be used by device 10, if desired.

Device 10 may also include input-output circuitry 16. Input-output circuitry 16 includes user input devices 18. User input devices 18 may include electrical components that allow a user of device 10 to supply control circuitry 12 with user input. For example, user input devices 18 may include buttons, joysticks, track pads, force-sensitive buttons, keyboards, gesture recognition sensors (e.g., sensors based on image sensors and/or other sensors that detect user gestures such as hand wave gestures, etc.), microphones for gathering voice commands, and/or other circuitry for gathering commands and other input from a user. If desired, devices 18 may include virtual reality gloves that track a user's hand motions and finger motions and that use these motions in controlling device 10.

Device 10 may also include environmental sensors 20. Environmental sensors 20 may include devices such as ambient light sensors, temperature sensors, humidity sensors, moisture sensors, air particulate sensors, carbon dioxide sensors and other gas concentration sensors, barometric pressure sensors and other air pressure sensors, magnetic sensors, cameras (e.g., one or more cameras that capture real-time images of the real-world environment currently surrounding device 10 so that these images may be presented in real time on a user viewable display and/or for recording images), gaze detection components (e.g., to detect a gaze of an external person in the vicinity of device 10), and/or other sensors that can gather readings on the environment surrounding the user of device 10.

User monitoring sensors 22 may be used to monitor the user of device 10. For example, sensors 22 may include image sensors (cameras) for gathering images of a user's face and other portions of a user. In some configurations, user monitoring sensors 22 may include cameras (digital image sensors) and other components that form part of a gaze tracking system. The camera(s) or other components of the gaze tracking system may face a user's eyes and may track the user's gaze (e.g., images and other information captured by the gaze tracking system may be analyzed by the circuitry of device 10 such as control circuitry 12 to determine the direction in which the user's eyes are oriented). This gaze information may be used to determine the location on a user-facing display in device 10 where the user's eyes are directed (sometimes referred to as the point of gaze of the user). If desired, the gaze tracking system may also gather information on the focus of the user's eyes and other information such as eye movement information. The gaze tracking system of user monitoring sensors 22 may sometimes be referred to as a gaze detection system, eye tracking system, gaze tracking system, or eye monitoring system. If desired, image sensors other than cameras (e.g., infrared and/or visible light-emitting diodes and light detectors, etc.) may be used in monitoring a user's gaze in system 62.

User monitoring sensors 22 may also include heart rate sensors (e.g., optical heart rate sensors that emit light and process detected reflected light signals, pressure-based heart rate sensors, etc.), blood oxygen level sensors, perspiration sensors (e.g., sensors based on image sensors and/or moisture sensors that detect user skin moisture levels), blood pressure sensors, electrocardiogram sensors, accelerometers to measure body movements, other physiological sensors, and/or other sensors that can measure attributes associated with a user. If desired, user monitoring sensors 22 may include motion sensors that measure the motion of device 10 and user 34. The motion sensors may be inertial measurement units based on components such as accelerometers, gyroscopes, and/or compasses, and/or may include other circuitry that measures motion. A motion sensor in sensors 22 may, for example, determine whether a user is sitting or is otherwise at rest or is walking, running, riding a bicycle, or is otherwise in motion and/or engaged in a physical activity.

Output devices 24 may include devices such as displays 26 and other visual output devices. In some configurations, status indicators may be used to present visual information. A status indicator or other non-display visual output device may include a light-emitting diode or other light-emitting component to convey information (e.g., a component that produces illumination using a fixed color, using multiple colors, using a time-varying light pattern, etc.). For example, a status indicator formed from a pair of light-emitting diodes of different colors may emit light of a first color when the user is busy and viewing content and may emit light of a second color when the user is not busy and is available for social interactions. In other configurations, non-status-indicator visual output devices may be used in presenting visual information such as images. Non-status-indicator visual output devices may include devices for presenting adjustable text, devices for presenting still and/or moving graphics, and displays (e.g., displays with pixel arrays having at least 1000 pixels, at least 10,000 pixels, fewer than million pixels, or other suitable number of pixels for presenting images).

In general, displays and other light-emitting components that emit light (e.g., light-emitting diodes, lasers such as vertical cavity surface emitting laser diodes, lamps, status indicator lights formed from multiple light sources such as these, backlit low-resolution output components such as backlight electrophoretic components, backlit patterned ink symbols, etc.) may be used to present any suitable visual information (e.g., icons, icons that flash with predetermined patterns or that have predetermined colors to convey information about the state of the user, whether content is being presented to the user, and/or other status information). Non-display components may have relatively few adjustable light-emitting components (e.g., 2-10 light-emitting diodes, fewer than 15 light-emitting diodes, at least one light-emitting diode, etc.). Displays 26, which generally include thousands of pixels or more, may be liquid crystal displays, liquid crystal-on-silicon displays, microelectromechanical systems displays, electrophoretic displays, light-emitting diode displays (e.g., organic light-emitting diode displays, displays based on pixels formed from crystalline semiconductor dies, sometimes referred to as micro-light-emitting diodes or microLEDs, etc.), or displays based on other display technologies. Displays 26 may include touch sensitive displays (e.g., displays with two-dimensional touch sensors formed from two-dimensional capacitive touch sensor electrode arrays) or may be insensitive to touch.

Figure 2:
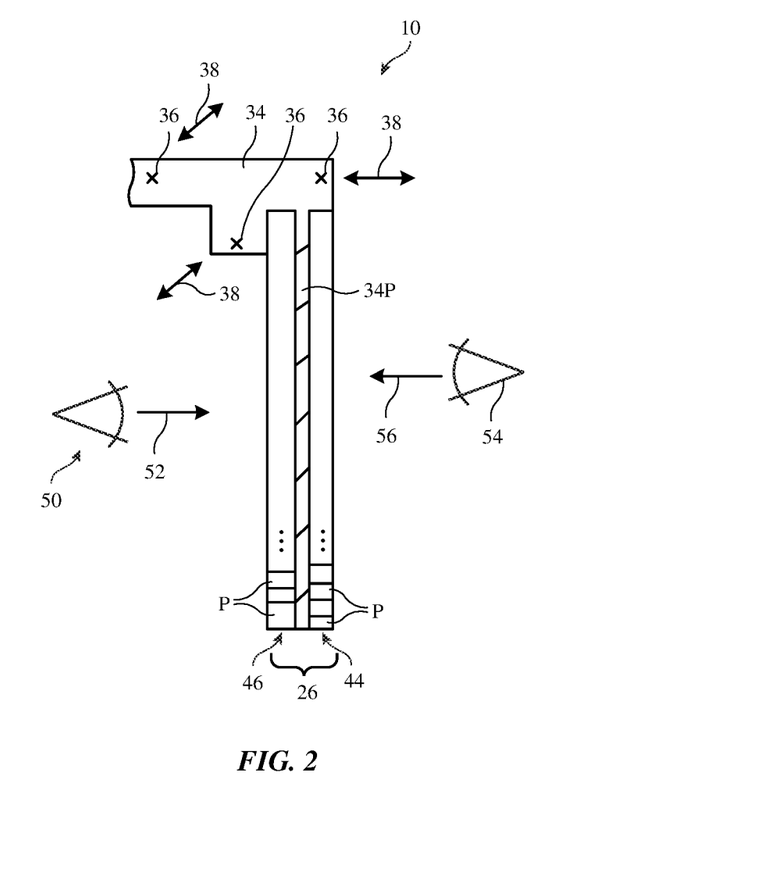
FIGS. 2, 3, and 4 are side views of illustrative displays mounted in a back-to-back configuration in accordance with an embodiment.

As shown in FIG. 2, displays 26 of device 10 may be supported by support structures 34. Support structures 34 may be head-mountable support structures (e.g., portions of glasses, a helmet, a hat, goggles, or other head-mounted device). Support structures 34 may have a substrate portion such as portion 34P that helps support displays 26. The circuitry of device 10 (see, e.g., the components of FIG. 1) may be mounted in positions such as positions 36 within a head-mounted support structure such as structures 34. This allows these components to input and/or output information in directions such as directions 38.

Displays 26 may include one or more inwardly facing displays such as display 46 that are visible to a user of head-mounted device 10 such as user 50, who is viewing display 46 in direction 52, and may include one or more outwardly facing displays such as display 44 that are visible to people in the vicinity of user 50 such as person 54, who is viewing display 44 in direction 56. Display 46 and display 44 may include pixels P that are configured to display images. In some configurations, device 10 may be operated while being held in the hand of the user. In this operating scenario, display 46 can be adjusted to display images directly on the face of display 46 for viewing by the user.

Inwardly facing displays such as display 46, which may sometimes be referred to as user viewable displays or internal display assemblies, may have display surfaces (pixel arrays) that are oriented towards a user's eyes when device 10 is worn on a user's head. In this scenario, display 46 may be hidden from view by individuals other than the user. Outwardly facing displays, which may sometimes be referred to as publicly viewable displays or external display assemblies may have display surfaces that are oriented away from the user. Outwardly facing displays will be visible to people in the vicinity of a user of device 10 such as person 54 but will not generally be visible to the user of device 10 such as user 50. An inwardly facing display may have the same resolution as an outwardly facing display or, if desired, the inwardly facing display may have a higher resolution than the outwardly facing display to enhance display quality for the user.

Outwardly facing displays can provide information that enables outward interactions of the user with the real world (e.g., people in the vicinity of the user). Outwardly facing displays may, for example, display information about the content that a user is viewing, information on the identity of the user, information on whether a user is occupied or is available for social interactions, and other information on the state of the user. If desired, an eye tracking system may be used to track a user's eyes and an outwardly facing display may be used to display virtual eyes that change appearance based on information on the state of the user's eyes gathered using the eye tracking system or other components. Facial features such as virtual eyebrows, emojis, and/or other content representative of the user's current emotional state may also be displayed on the outwardly facing display. An outwardly facing display may be used in forming a graphical user interface for people in the vicinity of the user (e.g., selectable on-screen items when the outwardly facing display is a touch screen or displays information responsive to voice commands from people in the vicinity of the user, etc.). When device 10 is not being worn by user 50, support structures 34 (e.g., hinged members, detachable members, etc.) may be stowed, allowing device 10 to be used as a cellular telephone, other portable electronic device, or other equipment that is not mounted on a user's head. In some configurations, portions of support structures 34 may be decoupled from displays 46 (e.g., to help make device 10 more compact and pocketable).

Figure 3:
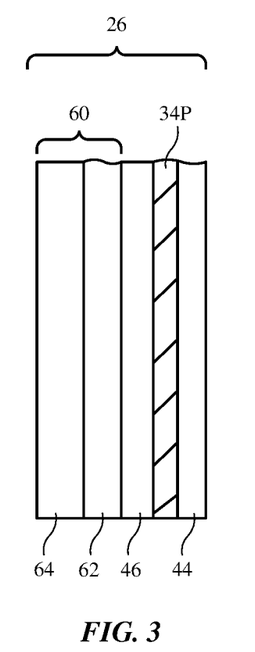

Displays 26, which may sometimes be referred to as back-to-back displays or oppositely oriented displays, may be attached back-to-back on opposing sides of an opaque support structure such as support structure substrate 34P of FIG. 3. Substrate 34P may be an opaque member formed from polymer, metal, and/or other materials.

Optical system 60 may be used to help a nearby user focus on images produced by display 46 (e.g., when the user's eyes are within 10 cm or so of display 26 while device 10 is on the user's head). With one illustrative arrangement, optical system 60 includes lenses 64 on transparent spacer 62. There may be left and right lenses 64 in lenses 64 corresponding to the left and right eyes of user 50. Lenses 64 may be Fresnel lenses, holographic lenses, or other lenses. Spacer 62 may be formed from transparent polymer, clear glass, or other transparent material.

Figure 4:
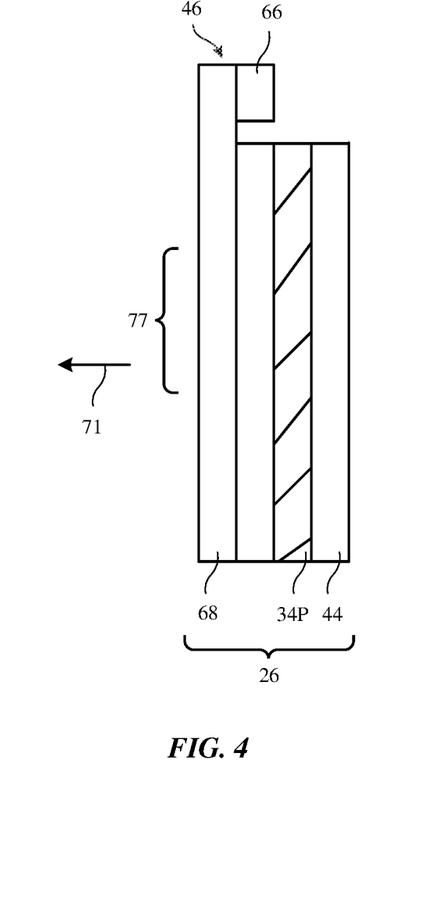

In the illustrative configuration of FIG. 4, light engine 66 (e.g., a microelectromechanical systems display) produces images that are guided by total internal reflection in waveguide 68. In region 70, a holographic output coupler with a built-in lens may be used to couple images out of waveguide 68 towards a user in direction 71. The holographic output coupler may be configured to have a lens power that allows the user to view the images at a close distance (e.g., when displays 26 are mounted directly in front of the user's eyes at a distance of 1-10 cm, at least 0.5 cm, less than 8 cm, etc.).

If desired, display 46 may have light directing structures associated with pixels P. The light directing structures, which may sometimes be referred to as light steering structures, beam steering structures, or light redirecting structures, may collimate and steer the light emitted from pixels P. Each pixel may, for example, have a prism, a microlens, a holographic microlens (sometimes referred to as a holographic light conditioning and directing device) or other structure that directs light in a desired direction. Configurations in which display 46 has pixels with microlenses may sometimes be described herein as an example. Prisms or other light direction structures may also be used.

Figure 5:
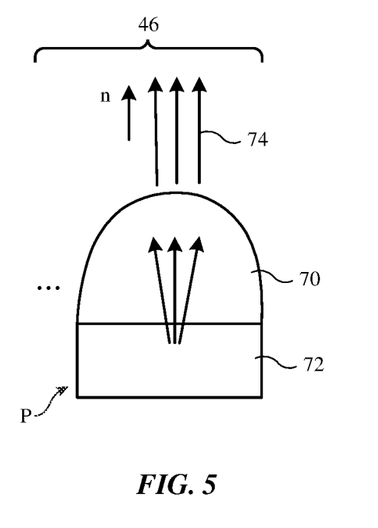
FIGS. 5 and 6 are side views of illustrative pixels in accordance with embodiments.

As shown in FIG. 5, display 46 may have pixels P that each include a light source such as light source 72. Light source 72 may be a vertical cavity surface emitting laser (VCSEL), a non-VCSEL laser diode (e.g., a crystalline semiconductor diode die such as a micro-light-emitting diode without a vertical cavity structure), or other light source. In some configurations, multiple vertical cavity surface emitting lasers may be formed on a common substrate that serves as the substrate for display 46. In other configurations, pick and place operations may be used to place vertical cavity surface emitting diodes or other laser diodes in desired locations on a substrate. For example, a pick-and-place tool may be used to mount an array of micro-light-emitting diodes onto a substrate such as a printed circuit or a semiconductor die to form an array of pixels P for display 46.

Figure 6:
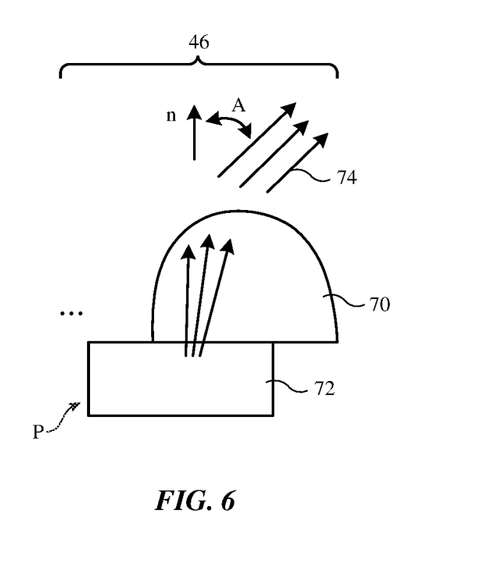

In each pixel P of FIG. 5, light source 72 emits light (e.g., red light for red pixels R, green light for green pixels G, and blue light for blue pixels B). The emitted light 74 is directed in a beam in a desired direction by a light redirecting structure such as a prism, holographic structure, or microlens 70 (e.g., a polymer lens or a lens formed from other transparent material). When the microlens 70 of a given pixel P is centered over the light source 72 of that pixel, light 74 is directed perpendicular to display 46 (e.g., parallel to surface normal n of display 46), as shown in FIG. 5. When the microlens 70 of a given pixel P is laterally offset (in the plane of display 46) from the center of its associated light source 72, emitted light 74 is directed at a non-zero angle A with respect to surface normal n, as shown in FIG. 6. If desired, each pixel P may emit a light beam of a desired angle by tilting the laser or other light source 72 that emits the light beam. The strengths and lateral offsets of microlenses 70 (or the characteristics of other light directing elements) may be configured so that images from display 46 are projected towards eye boxes for a user's left and right eyes.

As device 10 shifts relative to the eyes of the user, a user's eyes may potentially move out of a fixed eye box. Accordingly, display 46 may be configured to display images in multiple selectable eye boxes. During operation, gaze tracking sensor circuitry in device 10 can be used by control circuitry 12 to determine the current location of the user's eyes and an appropriate matching eye box into which images are directed can be selected dynamically.

Figure 7:
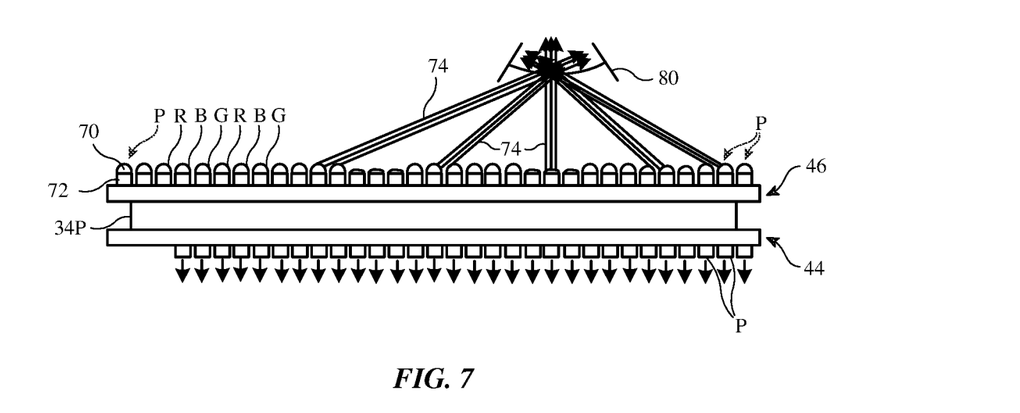
FIGS. 7 and 8 are side views of illustrative back to-back displays including a display that may be used to display virtual reality images in multiple selectable eye boxes in accordance with an embodiment.
Figure 8:
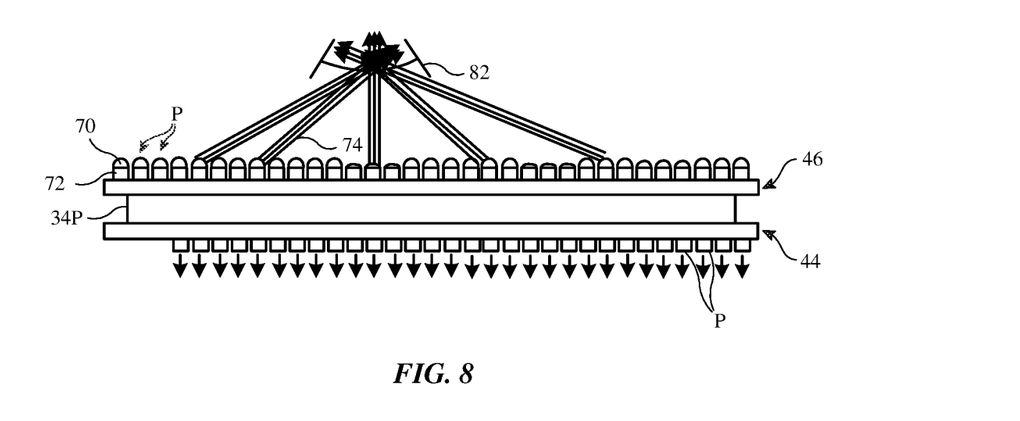

An illustrative configuration that allows display 46 to project images into multiple selectable eye boxes is shown in FIG. 7. As shown in FIG. 7, microlenses 70 may have different powers and lateral offsets, so that a first subset of pixels P direct light 74 to form images in a first corresponding eye box 80 (e.g., an eye box located 0.5-10 cm from display 46), as shown in FIG. 8. As shown in FIG. 8, an interleaved second subset of pixels P (different from the first subset) may direct light 74 to form images in a different second corresponding eye box 82 that is laterally offset from eye box 80.

Figure 9:
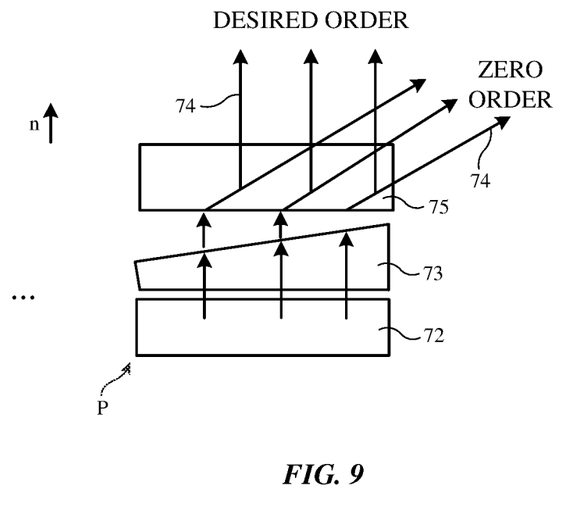
FIG. 9 is a side view of an illustrative pixel with an optical wedge interposed between a light source and a light redirecting structure such as a hologram (hologram lens) in accordance with an embodiment.

Additional subsets of pixels P may be used to produce images in one or more additional laterally offset eye boxes, if desired. The positions of the eye boxes may be arranged to overlap slightly at the eye box edges, to provide complete coverage without gaps in the event that a user's eyes move to a different eye box position during use of device 10. The pixels P that produce images in each of the laterally offset eye boxes may use any suitable light redirecting structures for oriented emitted light in desired directions (e.g., a prism, a hologram, a microlens, etc.). If desired, the hologram overlapping each light source 72 may be a transmission hologram. Transmission holograms may not be 100% efficient, so some light that is emitted perpendicular to the surface of the display by light source 72 may like through the transmission hologram rather than being redirected at a desired angle towards a desired eye box location. There is a risk that this leaked light, which may sometimes be referred to as zero order light, might result in undesirable image ghosts and contrast reduction. To reduce undesired effects such as these, an optical wedge may be interposed between light source 72 and the overlapping hologram. Consider, as an example, the arrangement of FIG. 9. As shown in FIG. 9, optical wedge 73 may be interposed between light source 72 and hologram 75. Wedge 73 may direct vertical emitted light 74 from light source 74 at a non-zero angle from surface normal n. As a result, the zeroth order light will be directed away from the user's eyes and will not appear as an undesirable ghost image. Hologram 75 may be configured to direct the off-axis zeroth order light towards a desired direction (e.g., towards an appropriate eye box). With this arrangement, even if hologram 75 is not 100% efficient, leaked light will not be received at the eye box and will therefore not be visible to the user.

Control circuitry 12 can dynamically select the set of pixels P to use in presenting images to the user (e.g., control circuitry 12 can dynamically select which eye box to use in presenting images to the user) based on gaze tracking sensor output or other information on the current position of the user's eyes relative to support structures 34 and other portions of device 10. In addition to accommodating shifting movement of device 10 relative to the head of a user, dynamic eye box control operations can be used to accommodate different user interpupillary distances.

Figure 10:
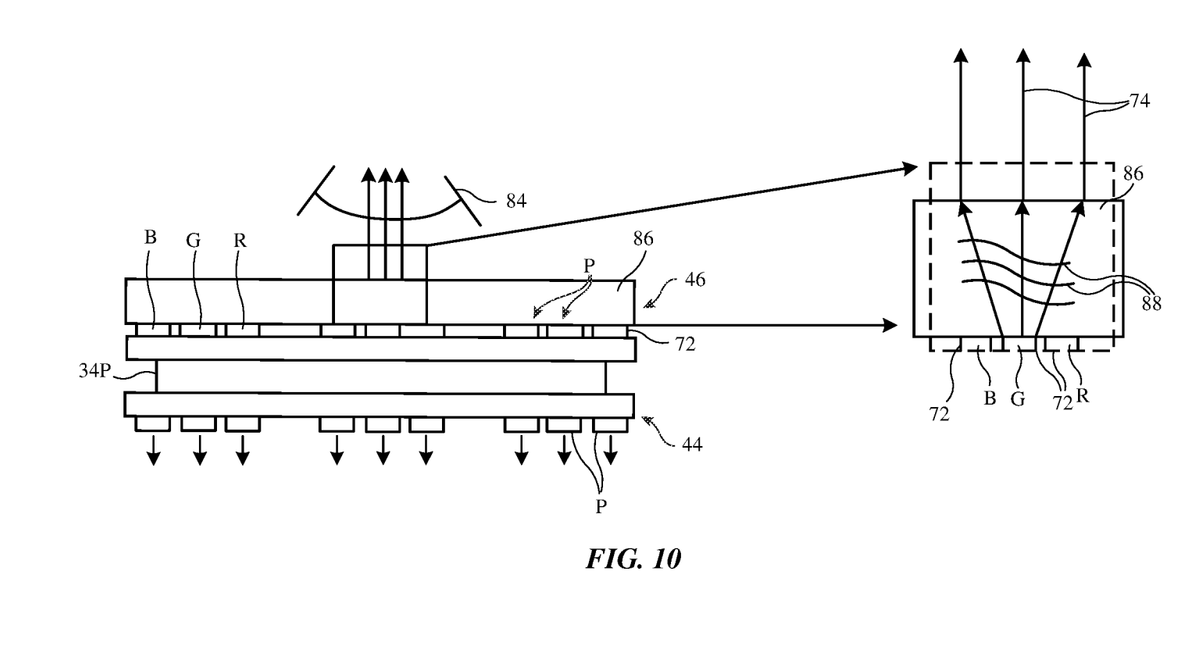
FIG. 10 is a side view of an illustrative display in which a holographic layer has been configured to form holographic light conditioning and directing devices that serve as beam steering elements for pixels in accordance with an embodiment.

If desired, display 46 may have holographic structures that help expend and collimate beams of light 74 from light sources 72 (e.g., to help increase pixels per inch and image resolution). This type of arrangement is shown in FIG. 10. As shown in FIG. 10, holographic layer 86 may overlap pixels P. Holographic layer 86 may be formed from a photosensitive polymer layer that changes index of refraction in response to light exposure during a hologram writing operation. Lasers may be used to record holographic structures 88 (e.g., gratings) into layer 86. The holographic structures form lenses (light directing structures) that help expand and collimate light from light sources 72. Separate holographic structures for red, green, and blue light can be recorded into the same holographic layer 86, or multiple holographic layers that are each configured to expand and collimate light 74 of a different respective wavelength can be laminated together to form layer 86. If desired multiple holographic structures may be formed on each pixel (e.g., different hologram recordings may be formed on each pixel). In this type of arrangement, each recording may serve as a separate holographic microlens that is used in directing light to a different eye box.

If desired, display 46 may have an array of lenses such as microlenses 70 that are formed from adjustable lens structures. These lenses exhibit variable lens power and may be tuned dynamically by control circuitry 12 to correct for a user's vision defects (nearsightedness, etc.) and/or to dynamically move an eye box (e.g., by dynamically shifting the center of the lens laterally). Variable lenses may be formed using mechanical deformation (e.g., using piezoelectric actuators, electrostatic actuators, etc.), using electro-optical refractive index adjustment structures, using tunable liquid crystal lens structures, using adjustable and/or fixed holograms, etc.

Figure 11:
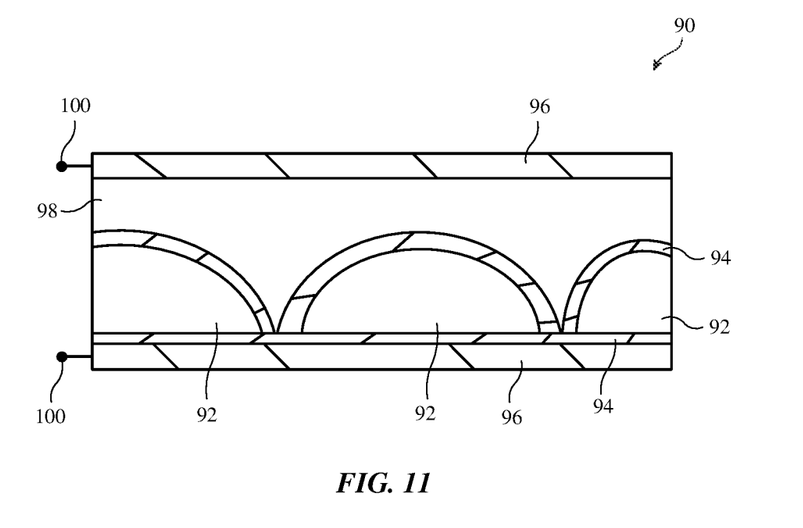
FIG. 11 is a cross-sectional side view of illustrative tunable lens structures in accordance with an embodiment.

An illustrative tunable liquid crystal lens 90 is shown in FIG. 11. Liquid crystal material 92 is placed between upper and lower transparent layers 94 (e.g., layers of polyimide or other clear polymer, etc.). Transparent material 98 (e.g., transparent polymer) may overlap lenses 90 to hold the lenses in a desired shape. Electrodes 96 may be formed above and below liquid crystal material 92. During operation, a voltage may be applied across terminals 100 by control circuitry 12. The signals on terminals 100 are applied to electrodes 96 and form an adjustable electric field through liquid crystal material 92. The refractive index of material 92 may be adjusted by adjusting the voltage applied to terminals 100 and the associated electric field through liquid crystal material 92. Passive matrix addressing or other control schemes may be used in tuning multiple lenses to form a desired pattern of lenses for vision correction, eye box position shifting, etc.

Figure 12:
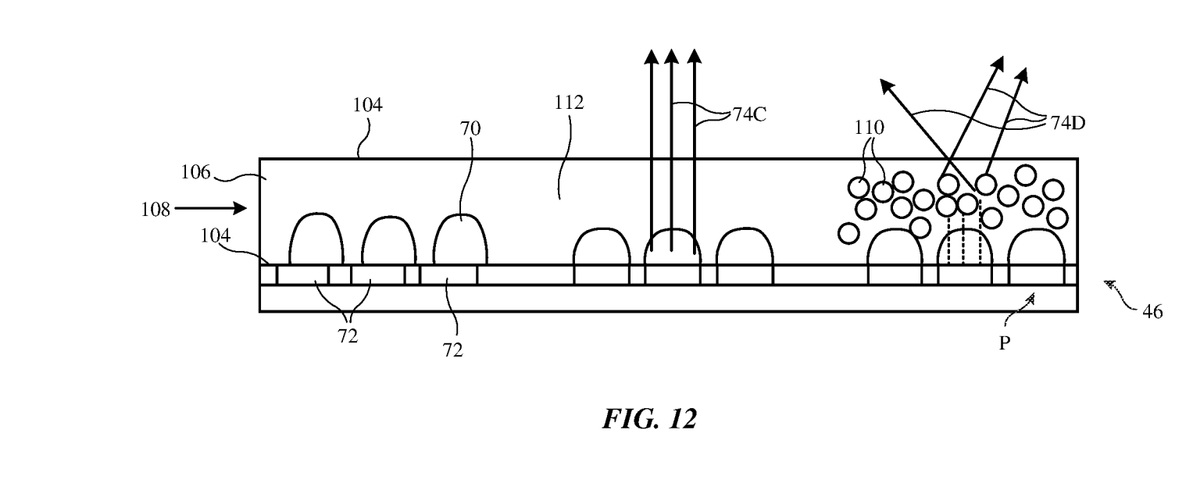
FIG. 12 is side view of an illustrative display with a switchable diffuser layer in accordance with an embodiment.

As shown in FIG. 12, display 46 may be provided with a switchable diffuser layer such as switchable diffuser layer 108. Layer 108 may include liquid crystal layer 112 and embedded particles 110. Electrodes 104 may be used by control circuitry 12 to apply an adjustable electric field to liquid crystal layer 112. When the electric field has a first value, the refractive index of layer 112 matches that of particles 110, so that the light from light sources 72 is not significantly scattered (see, e.g., collimated light 74C).

When the electric field has a different second value, the refractive index of layer 112 differs from that of particles 110. This refractive index discontinuity causes light emitted from light sources 72 in pixels P to be scattered (diffused) as indicated by scattered light 74D. When it is desired to use display 46 to display virtual reality images for user 50 while device 10 is mounted on the user's head, control circuitry 12 can place switchable diffuser layer 108 in its non-light-diffusing state. This allows microlenses 70 to collimate light and allows the light to be focused by the user's eye (e.g., the computer-generated virtual images may be viewed by the user and may, if desired, be overlaid on real-world images captured using a front-facing camera on support structures 34). When it is desired to use display 46 in an off-the-head configuration (e.g., when device 10 is being used as a handheld cellular telephone or other non-head-mounted electronic device), control circuitry 12 can place switchable diffuser layer 108 in a light-diffusing state. The light from pixels P will then be scattered (diffused) so that images may be viewed directly on the surface of display 46 (e.g., display 46 will operate as a cellular telephone display and will not project images toward a distant eye box).

The foregoing is merely illustrative and various modifications can be to the described embodiments. The foregoing embodiments may be implemented individually or in any combination.

What is claimed is:

1. An electronic device, comprising:
    first and second displays mounted back to back, wherein the first display has a higher resolution than the second display and has pixels with light directing elements;
    head-mounted support structures configured to support the first and second displays;
    an opaque support structure interposed between the first and second displays; and
    control circuitry configured to adjust the pixels of the first display to shift a location of images between multiple selectable eye boxes within the head-mounted support structures, wherein the images are displayed at only one of the multiple selectable eye boxes at a time.

2. The electronic device defined in claim 1 wherein the light directing elements comprise light directing elements selected from the group consisting of: microlenses and holographic light conditioning and directing devices.

3. The electronic device defined in claim 2 wherein the pixels include at least first and second subsets of pixels and wherein the control circuitry is configured to display the images in a first of the multiple selectable eye boxes by using the first subset of pixels and is configured to display the images in a second of the multiple selectable eye boxes by using the second subset of pixels.

4. The electronic device defined in claim 2 wherein the light directing elements comprise adjustable microlenses and wherein the control circuitry is configured to adjust the adjustable microlenses to accommodate user vision defects.

5. The electronic device defined in claim 2 wherein the control circuitry is configured to adjust the light directing elements to direct the images into a selected one of the multiple selectable eye boxes or to correct for myopia or hyperopia.

6. The electronic device defined in claim 1 wherein each of the pixels includes a light source that emits light that passes through a respective one of the light directing elements.

7. The electronic device defined in claim 6 wherein each of the light sources comprises a laser diode.

8. The electronic device defined in claim 7 wherein each of the laser diodes is a laser selected from the group consisting of: a vertical cavity surface emitting laser and a crystalline semiconductor die laser.

9. The electronic device defined in claim 1 wherein the first display includes a switchable diffuser that overlaps the pixels.

10. The electronic device defined in claim 1 wherein each pixel has a light directing element formed from multiple holographic recordings each of which directs light to a different respective eye box.

11. The electronic device defined in claim 1 further comprising:
    a switchable diffuser that overlaps the pixels of the first display, wherein the control circuitry is configured to adjust the switchable diffuser of the first display between a non-light-diffusing mode in which the pixels of the first display present images to a given one of the multiple selectable eye boxes and a light-diffusing mode in which light from the pixels is diffused and images are viewable on the first display.

12. The electronic device defined in claim 11 wherein each pixel includes a laser.

13. The electronic device defined in claim 12 wherein the laser of each pixel is a vertical cavity surface emitting laser.

14. The electronic device defined in claim 12 wherein the laser of each pixel is a micro-light-emitting diode mounted to a substrate with a pick-and-place tool.

15. The electronic device defined in claim 11 wherein the second display is configured to display publicly viewable images while the control circuitry is presenting virtual reality images to a user in the given one of the multiple selectable eye boxes.

16. The electronic device defined in claim 11 wherein each of the pixels includes a respective light steering structure.

17. The electronic device defined in claim 11 wherein the first display faces the multiple selectable eye boxes and the second display faces away from the multiple selectable eye boxes.

18. An electronic device, comprising:
    first and second displays mounted back to back and separated by an opaque member, wherein the first and second displays have pixels configured to display images and wherein the pixels of the first display include first and second sets of pixels;
    head-mounted support structures configured to support the first and second displays;
    an optical system that overlaps the first display, wherein the optical system includes a lens that directs light into an eye box in which the images from the pixels of the first display are viewable, wherein the first set of pixels are used without the second set of pixels to display the images at a first eye box location without displaying the images at a second eye box location, wherein the second set of pixels are used without the first set of pixels to display the images at the second eye box location without displaying the images at the first eye box location, wherein the second eye box location is different from the first eye box location, and wherein the first and second eye box locations are within the head-mounted support structures; and
    control circuitry that selects whether to use the first set of pixels or the second set of pixels based on gaze tracking information.

19. The electronic device defined in claim 18 wherein the lens includes a lens selected from the group consisting of: a Fresnel lens, a holographic lens, and lens in a holographic output coupler in a waveguide.

20. The electronic device defined in claim 18 wherein the pixels of the first display include lasers.

21. An electronic device, comprising:
- a display that has pixels configured to display an image, wherein each pixel has a light source;
- head-mounted support structures configured to support the display;
- an optical system that overlaps the display, wherein the optical system includes microlenses overlapping the pixels to direct light from the pixels into an eye box in which the image from the pixels is viewable and wherein the microlenses include a first set of microlenses having a first fixed lens power interleaved with a second set of microlenses having a second fixed lens power different from the first fixed lens power; and
- control circuitry configured to adjust the pixels to shift the image from a first eye box location to a second eye box location within the head-mounted support structures, wherein at least some of the pixels and microlenses are not in use when the image is displayed at the first eye box location.

22. The electronic device defined in claim 21 further comprising an additional display supported by the head-mounted support structures that faces away from the eye box.

* * * * *